United States Patent
Gumpoltsberger et al.

(10) Patent No.: US 8,230,751 B2
(45) Date of Patent: *Jul. 31, 2012

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 223 days.

This patent is subject to a terminal disclaimer.

(21) Appl. No.: 12/681,932

(22) PCT Filed: Oct. 8, 2008

(86) PCT No.: PCT/EP2008/063420
§ 371 (c)(1),
(2), (4) Date: Apr. 7, 2010

(87) PCT Pub. No.: WO2009/050069
PCT Pub. Date: Apr. 23, 2009

(65) Prior Publication Data
US 2010/0218628 A1    Sep. 2, 2010

(30) Foreign Application Priority Data
Oct. 15, 2007 (DE) .......................... 10 2007 049 260

(51) Int. Cl.
*F16H 3/08* (2006.01)
(52) U.S. Cl. ........................................................ 74/330
(58) Field of Classification Search .................... 74/330, 74/333, 340
See application file for complete search history.

(56) References Cited

U.S. PATENT DOCUMENTS

| | | | |
|---|---|---|---|
| 6,244,123 B1 | 6/2001 | Hegerath et al. | |
| 6,869,379 B2 * | 3/2005 | Voss et al. | 475/218 |
| 7,246,536 B2 | 7/2007 | Baldwin | |
| 7,287,442 B2 | 10/2007 | Gumpoltsberger | |
| 7,297,085 B2 * | 11/2007 | Klemen | 475/280 |
| 7,597,644 B2 * | 10/2009 | Rodgers, II | 475/218 |
| 7,604,561 B2 * | 10/2009 | Earhart | 475/218 |

(Continued)

FOREIGN PATENT DOCUMENTS
DE   38 22 330 A1   7/1989
(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de 3 2007.

*Primary Examiner* — Ha D. Ho
(74) *Attorney, Agent, or Firm* — Davis & Bujold, P.L.L.C.

(57) ABSTRACT

A double clutch transmission with two clutches connected to a drive shaft and to one of two transmission input shafts. Fixed gears are coupled to the input shafts and engage idler gears. Several coupling devices connect the idler gears to a countershaft which have an output gear that couple gears of an output shaft such power shift forward gears and a reverse gear can be shifted. Two dual gear planes each comprising one fixed gear which is supported by an input shaft and two idler gears which are supported by a respective countershaft. In each dual gear plane at least one idler gear wheel can be used for at least two gears. Two single gear planes each comprise an idler gear wheel and a fixed gear wheel, so that at least one winding-path gear can be shifted via the shifting device and one winding-path gear via another shifting device.

16 Claims, 12 Drawing Sheets

U.S. PATENT DOCUMENTS

| | | |
|---|---|---|
| 8,051,732 B2 * | 11/2011 | Gitt .................................. 74/331 |
| 2006/0054441 A1 | 3/2006 | Ruedle |
| 2009/0036247 A1 * | 2/2009 | Earhart et al. .................. 475/35 |

FOREIGN PATENT DOCUMENTS

| | | |
|---|---|---|
| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

Fig. 2

| G | ZS | K1 | K2 | A | B | C | D | E | F | I | K |
|---|---|---|---|---|---|---|---|---|---|---|---|
| G1 | i_3·i_6·i_2 | | 1 | | | | | | 1 | 1 | |
| G2 | i_2 | 1 | | | | | | | 1 | | |
| G3 | i_3 | 1 | 1 | 1 | | | | | | | |
| G4 | i_4 | | 1 | | | | | 1 | | | |
| G5 | i_5 | 1 | 1 | | | | 1 | | | | |
| G6 | i_6 | 1 | 1 | | 1 | | | | | | |
| G7 | i_5·i_4·i_6 | | 1 | | 1 | | | | | | 1 |

| R- GEAR | | | | | | | | | | | |
|---|---|---|---|---|---|---|---|---|---|---|---|
| R1 | i_R | 1 | | | | 1 | | | | | |
| R2 | i_3·i_6·i_R | | 1 | | | 1 | | | | 1 | |

| OVERDRIVE GEAR | | | | | | | | | | | |
|---|---|---|---|---|---|---|---|---|---|---|---|
| O1 | i_6·i_3·i_5 | 1 | | | | | 1 | | | 1 | |

| G | ZS | K1 | K2 | A | B | C | D | E | F | I | K | S_abl |
|---|---|---|---|---|---|---|---|---|---|---|---|---|
| G1 | i_5·i_6·i_2 |  |  |  |  | 1 |  |  |  | 1 |  | 1 |
| G2 | i_2 | 1 |  |  |  | 1 |  |  |  |  |  | 1 |
| G3 | i_3 |  | 1 |  |  |  | 1 |  |  |  |  | 1 |
| G4 | i_4 | 1 |  |  |  |  |  | 1 |  |  |  | 1 |
| G5 | i_5 |  | 1 | 1 |  |  |  |  |  |  |  | 1 |
| G6 | i_6 | 1 |  |  | 1 |  |  |  |  |  |  | 1 |
| G7 | i_4·i_3·i_5 | 1 | 1 | 1 |  |  |  |  |  |  | 1 | 1 |

R – GEAR

| G | ZS | K1 | K2 | A | B | C | D | E | F | I | K | S_abl |
|---|---|---|---|---|---|---|---|---|---|---|---|---|
| R1 | i_R | 1 |  |  |  |  |  |  | 1 | 1 |  | 1 |
| R2 | i_5·i_6·i_R |  | 1 |  |  |  |  |  | 1 |  |  | 1 |
| R3 | i_3·i_4·i_R | 1 | 1 |  |  |  |  |  | 1 | 1 |  | 1 |

SLOW SPEED GEAR

| G | ZS | K1 | K2 | A | B | C | D | E | F | I | K | S_abl |
|---|---|---|---|---|---|---|---|---|---|---|---|---|
| C1 | i_3·i_4·i_2 | 1 |  |  |  | 1 |  |  |  |  |  | 1 |
| C2 | i_2·i_5·i_3 | 1 |  | 1 |  | 1 |  |  |  |  | 1 | 1 |

OVERDRIVE GEAR

| G | ZS | K1 | K2 | A | B | C | D | E | F | I | K | S_abl |
|---|---|---|---|---|---|---|---|---|---|---|---|---|
| O1 | i_5·i_2·i_4 |  | 1 | 1 |  | 1 | 1 |  |  |  |  |  |

Fig. 4

| G | ZS | K1 | K2 | A | B | C | D | E | F | I | K | S_ab1 | S_ab2 |
|---|---|---|---|---|---|---|---|---|---|---|---|---|---|
| G1 | i_5_i_6_i_2 | | | | | | | | 1 | 1 | | 1 | 1 |
| G2 | i_2 | 1 | | | | | | | 1 | | | 1 | 1 |
| G3 | i_3 | 1 | | | | | 1 | | | | | 1 | 1 |
| G4 | i_4 | | 1 | | | | | 1 | | | | 1 | 1 |
| G5 | i_5 | | 1 | 1 | | | | | | | | 1 | 1 |
| G6 | i_6 | 1 | | | 1 | | | | | | | 1 | 1 |
| G7 | i_4_i_3_i_5 | 1 | | 1 | | | | | | | 1 | 1 | 1 |

R-GEAR

| G | ZS | K1 | K2 | A | B | C | D | E | F | I | K | S_ab1 | S_ab2 |
|---|---|---|---|---|---|---|---|---|---|---|---|---|---|
| R1 | i_5_i_R_i_4 | | 1 | 1 | | 1 | | 1 | | | | | 1 |
| R2 | i_5_i_R_i_2 | | 1 | 1 | | 1 | | | 1 | | | | 1 |
| R3 | i_R | 1 | | | | 1 | | | | | | 1 | 1 |

SLOW SPEED GEAR

| G | ZS | K1 | K2 | A | B | C | D | E | F | I | K | S_ab1 | S_ab2 |
|---|---|---|---|---|---|---|---|---|---|---|---|---|---|
| C1 | i_3_i_4_i_2 | | 1 | 1 | 1 | | | | 1 | | 1 | 1 | 1 |

OVERDRIVE GEAR

| G | ZS | K1 | K2 | A | B | C | D | E | F | I | K | S_ab1 | S_ab2 |
|---|---|---|---|---|---|---|---|---|---|---|---|---|---|
| O1 | i_3_i_2_i_6 | | 1 | 1 | 1 | 1 | 1 | | 1 | | 1 | 1 | |

| G | ZS | K1 | K2 | A | B | C | D | E | F | I | K | S_ab1 |
|---|---|---|---|---|---|---|---|---|---|---|---|---|
| G1 | i_5·i_6·i_2 |  | 1 |  |  | 1 |  |  |  | 1 |  | 1 |
| G2 | i_2 | 1 |  |  |  | 1 |  |  |  |  |  | 1 |
| G3 | i_3 |  | 1 |  |  |  | 1 |  |  |  |  | 1 |
| G4 | i_4 | 1 |  |  |  |  |  | 1 |  |  |  | 1 |
| G5 | i_5 |  | 1 | 1 |  |  |  |  |  |  |  | 1 |
| G6 | i_6 | 1 |  |  | 1 |  |  |  |  |  |  | 1 |
| G7 | i_4·i_3·i_5 | 1 |  | 1 |  |  |  |  |  |  | 1 | 1 |
| R− GEAR | | | | | | | | | | | | |
| R1 | i_R | 1 |  |  |  |  |  |  | 1 |  |  | 1 |
| R2 | i_5·i_6·i_R |  | 1 |  |  |  |  |  | 1 | 1 |  | 1 |
| R3 | i_3·i_4·i_R |  | 1 |  |  |  |  |  | 1 |  | 1 | 1 |
| SLOW SPEED GEAR | | | | | | | | | | | | |
| C1 | i_3·i_4·i_2 | 1 |  |  |  | 1 |  |  |  |  |  | 1 |
| C2 | i_2·i_5·i_3 | 1 |  | 1 |  | 1 |  |  |  |  |  | 1 |
| OVERDRIVE GEAR | | | | | | | | | | | | |
| O1 | i_5·i_2·i_4 |  | 1 | 1 |  | 1 |  | 1 |  |  |  |  |

Fig. 10

| G | ZS | K1 | K2 | A | B | C | D | E | F | I | K | S_ab1 |
|---|---|---|---|---|---|---|---|---|---|---|---|---|
| G1 | i_3_i_4_i_2 |  |  |  |  | 1 |  |  |  | 1 |  | 1 |
| G2 | i_2 | 1 | 1 |  |  | 1 |  |  |  |  |  | 1 |
| G3 | i_3 |  | 1 | 1 |  |  |  |  |  |  |  | 1 |
| G4 | i_4 | 1 |  |  | 1 |  |  |  |  |  |  | 1 |
| G5 | i_5 |  | 1 |  |  |  | 1 |  |  |  |  | 1 |
| G6 | i_6 | 1 |  |  |  |  |  |  | 1 |  |  | 1 |
| G7 | i_4_i_3_i_5 | 1 |  |  |  |  | 1 |  |  | 1 |  | 1 |
| R- GEAR |  |  |  |  |  |  |  |  |  |  |  |  |
| R1 | i_5_i_R_i_2 |  | 1 |  |  | 1 |  |  |  |  | 1 | 1 |
| OVERDRIVE GEAR |  |  |  |  |  |  |  |  |  |  |  |  |
| O1 | i_3_i_2_i_6 |  | 1 | 1 |  | 1 |  |  | 1 |  |  |  |

Fig. 12

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 | | 1 | | | | | | | | | 1 | 1 |
| G2 | i_2 | 1 | | | | | | | 1 | | | | 1 | 1 |
| G3 | i_3 | | 1 | 1 | | | | | | | | | 1 | 1 |
| G4 | i_4 | 1 | | | 1 | | | | | | | | 1 | 1 |
| G5 | i_5 | | 1 | | | | 1 | | | | | | 1 | 1 |
| G6 | i_6 | 1 | | | | 1 | | | | | | | 1 | 1 |
| G7 | i_4·i_3·i_5 | 1 | | | | | | 1 | | | 1 | | 1 | 1 |
| R– GEAR | | | | | | | | | | | | | | |
| R1 | i_5·i_R·i_2 | 1 | 1 | | | | | | | | | 1 | 1 | 1 |
| SLOW SPEED GEAR | | | | | | | | | | | | | | |
| C1 | i_2·i_5·i_3 | 1 | | 1 | | | 1 | | | 1 | | | 1 | |
| OVERDRIVE GEAR | | | | | | | | | | | | | | |
| O1 | i_5·i_2·i_4 | | 1 | 1 | 1 | 1 | | | | 1 | | | 1 | |
| O2 | i_6·i_3·i_5 | | 1 | 1 | 1 | 1 | | | | 1 | | | | 1 |

DUAL CLUTCH TRANSMISSION

This application is a National Stage completion of PCT/EP2008/063420 filed Oct. 8, 2008, which claims priority from German patent application serial no. 10 2007 049 260.1 filed Oct. 15, 2007.

FIELD OF THE INVENTION

The present invention relates to a double clutch transmission for a motor vehicle.

BACKGROUND OF THE INVENTION

Known from the publication DE 103 05 241 A1 is a 6-speed or 7-speed dual clutch transmission. The dual clutch transmission comprises two clutches, each connected with their inputs to the drive shaft and their output to one of the two transmission input shafts. The two transmission input shafts are coaxially positioned towards each other. In addition, two countershafts are arranged to be axially parallel to the transmission input shafts, their idler gear wheels mesh with the fixed gear wheels of the transmission input shafts. Furthermore, coupling devices that are axially movable are positioned rotationally fixed manner on the countershaft to shift the respective gear wheels. Each selected ratio is transferred by the drive gear wheels to a differential transmission. To achieve the desired gear ratio steps in this known double clutch transmission, a vast number of gear planes are required, so that a significant installation space is needed.

In addition, a spur gear change speed transmission is known from the publication DE 38 22 330 A1. The spur gear change speed transmission comprises a double clutch, switchable under power, with one part connected with a drive shaft and the other part with a hollow drive shaft that is positioned rotatably on the drive shaft. For certain gear ratios, the drive shaft can be coupled with the hollow drive shaft via a shifting device Known from the publication DE 10 2004 001 961 A1 is a power transmission with two clutches, each of which are assigned to a partial transmission. The transmission input shafts of the two partial transmissions are positioned coaxially to each other and mesh, via fixed gear wheels, with idler gear wheels of the designated countershaft. The respective idler gear wheels of the countershafts can be connected in a rotationally fixed manner, with the respective countershaft via designated shifting devices. The particular idle wheels of the countershaft can be connected in a rotationally fixed manner via the assigned shifting devices with the associated countershaft. A 7-gear transmission, among other things, is known from this publication in which an additional shift element is provided to connect the two transmissions input shafts to establish an additional transmission stage. The 7-gear transmission requires in this embodiment at least six gear planes in the two partial transmissions, to achieve the transmission stages. This causes an unwanted extension of the needed installation length in axial direction, such that the use of this in a motor vehicle is significantly limited.

SUMMARY OF THE INVENTION

It is the task of the present invention to propose a dual clutch transmission based on the previously described type, in which power engaging gear ratio steps can be realized, cost-efficiently and with just few component parts, which need little installation space.

Thus, a double clutch transmission with two clutches, optimized for needed installation space, is proposed, in which the inputs are connected with a drive shaft and the outputs are each connected with one of two coaxial, transmission input shafts. The double clutch transmission comprises at least two countershafts, on which gear wheels, designed as idler gear wheels, are rotatably supported, and on the two transmissions input shafts, wheels are positioned, in a rotationally fixed manner and designed as fixed gear wheels, which at least partially mesh with the idler gear wheels. In addition, several coupling devices, or similar, are provided for connecting an idler gear wheel with a countershaft in a rotationally fixed manner. The double clutch transmission, in accordance with the invention, has one output gear wheel each, or constant pinion at the two countershafts, which each are coupled with gears of a drive shaft, to connect the respective countershaft with the output, and has at least an actuating or lockable shifting device or similar, as a so-called winding-path gear shifting device for connecting the two gear wheels in a rotationally fixed manner, whereby several power engaging forward gears and at least one reverse gear are engagable.

In accordance with the invention, the double clutch transmission can comprise preferably just four gear planes, whereby, for instance, two dual gear planes are provided, and, in each dual gear plane, an idler gear wheel is assigned, on the first and the second countershaft, and assigned to a fixed gear wheel of the transmission input shafts, whereby in each double gear plane at least one idler gear wheel can be used for at least two gears, and whereby, for instance, two single gear planes are provided, in which one idler gear wheel of the countershaft is assigned to a fixed gear wheel of one of the transmission input shafts, so that at least one winding-path gear is engagable via a first shift device and at least one winding-path gear is engaged via an additional shifting device.

Due to the possible multi-use of idler gear wheels, the proposed double clutch transmission enables a maximum number of gear ratios with as few gear planes as possible, whereby preferably all forward gears and all reverse gears are power engaging at sequential execution.

Through the use of two single planes, instead of a double gear plane, meaning a fixed gear wheel is replaced by two fixed gear wheels, the inventive double clutch transmission can achieve harmonious, progressive gear stepping, especially in the fourth, fifth, sixth, and seventh gears. In addition, a maximum of three shifting devices are used for each of the shafts, which can be realized via shifting devices and/or coupling devices, with the need for, if necessary, a maximum of two actuation devices at each countershaft. Furthermore, the last or second last gear step in this inventive double clutch transmission can be designed higher than the respective previous one, to provide, during downshifting as requested by the driver, and especially high drive torque and drive power.

The inventive and presented double clutch transmission can preferably be designed as a 7-gear transmission. Due to the shortened installation space, as compared to known transmission configurations, the inventive double clutch transmission is especially applicable in a front-transverse installation space. However, other constructions are also possible, and depend on the design and the available construction of the respective motor vehicle.

It can be provided within a possible embodiment of the present invention that an idler gear wheel of the second partial transmission is connected, via the shifting device on the first countershaft, to an idler gear wheel of the first partial transmission, so that at least a first forward gear, via the activated, or engaged shifting device can be shifted as winding-path gear, and that an idler gear wheel of the second partial transmission can be connected, via an additional shifting device on the second countershaft, with an idler gear wheel of the first partial transmission, so that via that activated or engaged shifting device at least a seventh forward gear can be shifted as winding-path gear. Other connections are also possible.

It can be provided, in accordance with another embodiment of the invention, that an idler gear wheel of the second partial transmission can be connected, via the shifting device on the first countershaft, to an idler gear wheel of the first partial transmission, so that via the activated shifting device, at least a first forward gear and a seventh forward gear can be shifted as a winding-path gear, and an idler gear wheel of the second partial transmission can be connected, via the shifting device on the second countershaft, to an idler gear wheel of the first partial transmission, so that at least one reverse gear can be shifted, via the activated shifting device, as a winding-path gear. Other connections are also possible.

Thus, and through the inventive double clutch transmission, winding-path gears can be realized at least via the two shifting devices in which the gear wheels of both partial transmissions are connected to each other, to enable the flow of force through both partial transmissions. Each of the used shifting devices serves hereby for connecting two idler gear wheels and therefore, creates the dependency between the transmission input shafts.

The positioning of the shifting devices to connect two defined idler gear wheels, independently of each embodiment of the double clutch transmission, can vary, so that the shifting devices do not have to be necessarily positioned between the idler gear wheels which have to be connected. Thus, other positioning arrangements of each shifting device are conceivable, for instance to optimize the connectage to an actuating device.

It can be provided, in accordance with a possible embodiment of the double clutch transmission, that the first gear plane, designed as dual gear plane, comprises a fixed gear wheel at the second transmission input shaft of the second partial transmission, and that the second gear plane, designed as dual gear plane, and the third and fourth gear planes, designed as single gear planes, comprise three fixed gear wheels at the first transmission input shaft of the first partial transmission. However, another embodiment allows that the first gear plane, designed as dual gear plane, comprise a fixed gear wheel at the second transmission input shaft of the second partial transmission, and that the second and the third gear plane, designed as single gear plane, and the fourth gear plane, designed as dual gear plane, comprise three fixed gear wheels at the first transmission input shaft of the first partial transmission. Hereby, and independent from each embodiment, each of the four fixed gear wheels of the transmission input shafts can be used for at least two gears. In an advantageous design, only three idle wheels, for the forward gearing, are needed on a countershaft, which mesh with fixed gear wheels of the transmission input shaft, and only two idler gear wheels are needed on the other countershaft, which also meshes with fixed gear wheels of the transmission input shafts.

For the realization of reverse gears for this inventive double clutch transmission, an intermediate gear wheel can be applied, which, for instance, is positioned on an intermediate shaft. It is also possible that one of the idler gear wheels of a countershaft serves for at least one reverse gear position. Thus, an additional intermediate shaft is not needed for the reverse gear transmission, because one of the idle wheels mashes with a fixed gear wheel, and with an additional idle wheel of the other countershaft. Therefore the intermediate gear, required for the reverse gear, is positioned to engage an idler gear wheel on a countershaft and it also serves for the realization of at least one additional forward gear. The intermediate gear can always be designed as step gear, independent of whether it is positioned on the countershaft or on an additional intermediate shaft.

To obtain the desired transmission ratio steps, this inventive double clutch transmission provides that at each countershaft at least one dual action coupling device, or similar, is positioned. The provided coupling devices, either in the activated or engaged condition, depending on the direction of activation, can each connect in a rotationally fixed manner an assigned idler gear wheel to the countershaft. Also, a single action coupling device, or similar, can be positioned on least one of the countershafts. Clutches, which are operated as hydraulic, electric, pneumatic, mechanically operated clutches, or interlocking claw couplings can be used as coupling devices, as well as any kind of synchronization device which serves as the rotationally fixed connection of an idler gear wheel of a countershaft. It is possible to replace a dual action coupling device with two single action coupling devices and vice versa.

It is possible that the mentioned options for the positioning of the gear wheels vary, and also the number of gear wheels and the number of coupling devices are altered to realize additional power engaging and non-power engaging gears, for further reduction of installation space and component cost reduction for this inventive double clutch transmission. Especially fixed gear wheels of dual gear planes can be split into two fixed gear wheels for two single gear planes. Hereby, the shifting can be improved. It is also possible, to swap the countershafts. The partial transmissions can also be swapped, meaning in a mirror image around a vertical axle. Hereby, the hollow shaft and the solid shaft are swapped. It is possible hereby to position the smallest gear wheel on the solid shaft, to further optimize the use of the available installation space. In addition, neighboring gear planes can be swapped, to optimize a deflection of the shaft and/or to optimize the connecting of a shifting actuator device. Also, the respective mounting position of the coupling devices on the gear plane can be varied. In addition, also the direction of actuation of the coupling devices can be varied.

The gear numbering used herein is freely defined. It is also possible to add a crawler gear, to improve the off road characteristics or the acceleration performance of a motor vehicle. In addition, the first gear can be left out, for instance, to better optimize the entirety of the gear steps. The numbering of the gears varies through these measures accordingly.

Independent of the respectives embodiments of the double clutch transmission, the drive shaft and the output shaft can be positioned non-coaxial to each other, which enables an especially space saving configuration. For instance, the shafts which are spatially positioned one after another, can also be slightly offset from each other. In that configuration, a direct gear with the transmission ratio of one can be realized via teeth engagement and can be shifted, relatively freely, to the fourth, fifth, for sixth gear. A different configuration option of the drive shaft and the output shaft is also possible.

Preferably, the proposed double clutch transmission is equipped with an integrated output stage. The output stage can comprise a fixed gear wheel as an output gear at the output shaft, which is meshes with a first output gear wheel, as a fixed gear wheel of the first countershaft, and a second output gear wheel, as a fixed gear wheel of the second countershaft. However, it is possible that at least one of the output gear wheels is designed as meshing gear wheel.

Advantageously, the lower forward gears and the reverse gears can be activated by a starting or shifting clutch to hereby focus higher loads on this clutch and to construct the second clutch with less need for space and as more cost-effective. Especially, the gear planes in the proposed double clutch transmission can be positioned in a way that one can start, through the inner transmission input shaft as well as through the outer transmission input shaft, hereby always starting through the more appropriate clutch, which is also possible in a concentrically positioned, radially nested construction of the double clutch. Hereby and accordingly, the gear planes can be positioned as mirror-symmetric, or swapped, respectively. It is also possible that the countershafts be swapped or positioned in a mirror image.

Independent from the respective embodiments, the provided gear planes of the double clutch transmission can be swapped. It is also possible, to use instead of a dual gear plane, two single gear planes and/or vice versa. In addition, the two partial transmissions can be positioned as in a mirror image.

BRIEF DESCRIPTION OF THE DRAWINGS

Following, the present invention is further explained based on the drawings. It shows:

FIG. 2 a shift scheme of the first embodiment in accordance with FIG. 1;

FIG. 4 a shift scheme of the second embodiment in accordance with FIG. 3;

FIG. 6 a shift scheme of the third embodiment in accordance with FIG. 5;

FIG. 8 a shift scheme of the fourth embodiment in accordance with FIG. 7;

FIG. 10 a shift scheme of the fifth embodiment in accordance with FIG. 9;

FIG. 12 a shift scheme of the sixth embodiment in accordance with FIG. 11.

DETAILED DESCRIPTION OF THE PREFERRED EMBODIMENTS

In each of the FIGS. 1, 3, 5, 7, 9, 11, possible embodiments of a 7-gear double clutch transmission are shown. The respective shift schemes of the embodiments are presented in FIGS. 2, 4, 6, 8, 10, and 12 as tables.

The 7-gear double clutch transmission comprises two clutches K1 and K2, in which the input sides are connected to a drive shaft w_an, and the output sides are each connected with one of the two, coaxially positioned, transmission input shafts w_K1, w_K2. Also, a torsion vibration damper 14 can be positioned at the drive shaft w_an. In addition, two countershafts w_v1, w_v2 are provided, on which gear wheels are rotatably positioned and designed as idler gear wheels 5, 6, 7, 8, 9, 10. On the two transmission input shafts w_K1, w_K2, gear wheels that are rotatably positioned and designed as fixed gear wheels 1, 2, 3, 4, which at least partially mesh with the idler gear wheels 5, 6, 7, 8, 9, 10.

To connect the idler gear wheels 5, 6, 7, 8, 9, 10 with the respective countershaft w_v1, w_v2, several coupling devices A, B, C, D, E, F, which can be activated or engaged are provided with the countershaft w_v1, w_v2. In addition, drive gear wheels 12, 13 are positioned at the two countershafts w_v1, w_v2 and designed as constant pinions, which are coupled with gears of an output drive shaft w_ab.

Beside the coupling devices A, B, C, D, E, F, which provide a rotationally fixed connection between a gear wheel and the respective countershaft w_v1, w_v2, at least two winding-path gear shifting devices K and I are provided in the double clutch transmission to provide rotationally fixed connection of two gear wheels of a countershaft w_v1, w_v2, to realize at least one winding-path gear.

Thus, and in accordance with the invention, the double clutch transmission has only four gear planes, whereby in each embodiment two dual gear planes 5-8, 6-9; 5-8, 7-10 are provided and two single gear planes 6-2, 3-9; 7-3, 4-10 are provided so that at least each one power shiftable winding-path gear can be shifted via the shifting devices K and I. For instance, a claw can be used as shifting devices for K and I, or similar, to connect two gear wheels.

Independent of the respective embodiment, both partial transmissions are used for the first forward gear G1 and for the highest forward gear G7, and at least one reverse gear, because they are winding-path gears. The first power shiftable forward gear is also a winding-path gear. In addition, the gear steps i_3 and i_5 of the power shiftable forward gears G3 and G5 are placed together in the first gear plane as the dual gear plane 5-8.

Figure 1:
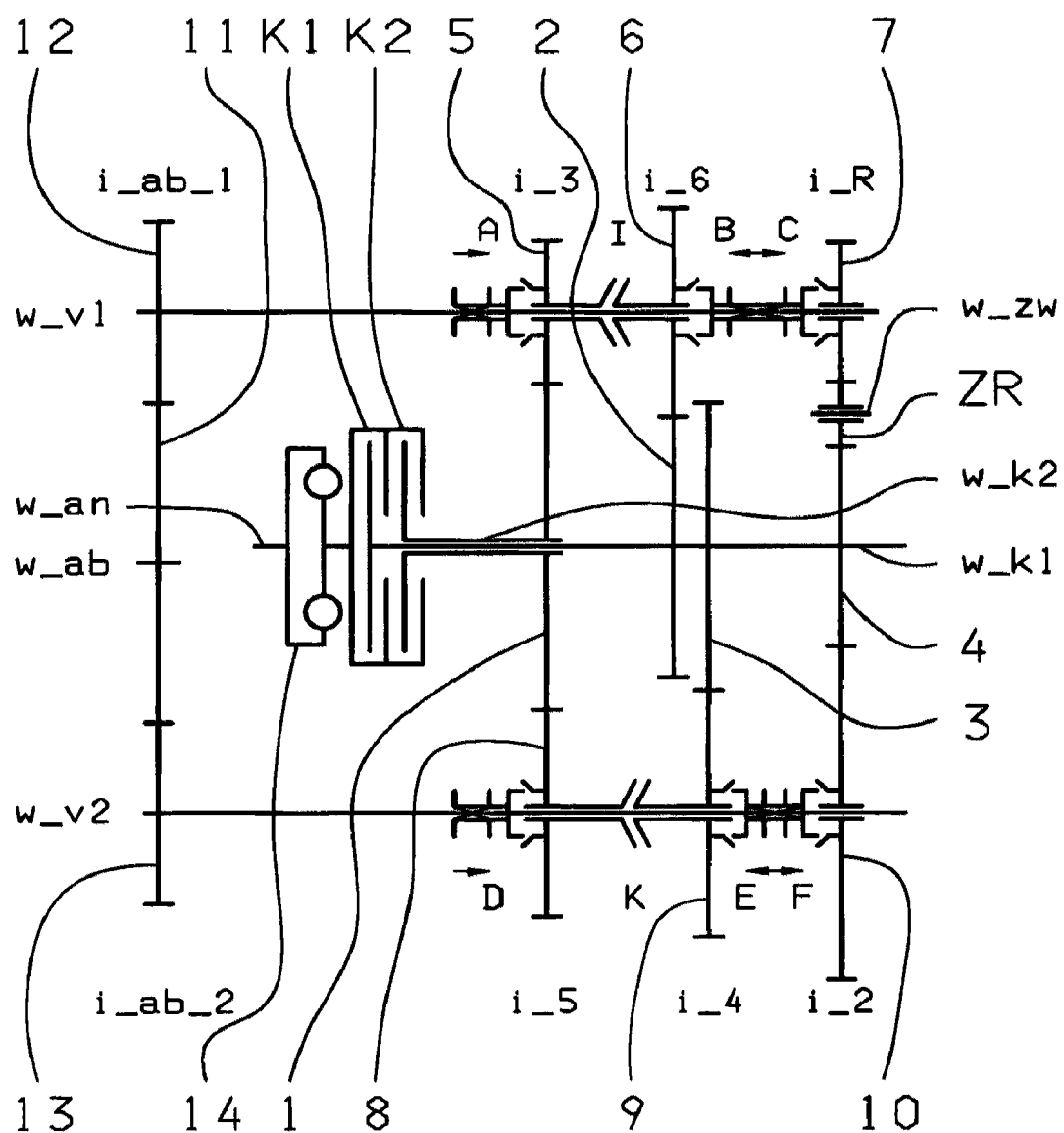
FIG. 1 a schematic view of a first embodiment of an inventive 7-gear double clutch transmission.

In the first embodiment, in accordance with FIG. 1, in the first gear plane, designed as a dual gear plane 5-8, the fixed gear wheel 1 of the second transmission input shaft w_K2 meshes with the idler gear wheel 5 of the first countershaft w_v1, and with the idler gear wheel 8 of the second countershaft w_v2. In the second gear plane, designed as a single gear plane, the fixed gear wheel 2 of the first transmission input shaft w_K1 meshes with the idler gear wheel 6 of the first countershaft w_v1. In the third gear plane, designed as a single gear plane, the fixed gear wheel 3 of the first transmission input shaft w_K1 meshes with the idler gear wheel 9 of the second countershaft w_v2. Finally in the fourth gear plane, designed as a dual gear plane 7-10, the fixed gear wheel 4 of the first transmission input shaft w_k1 meshes with the idler gear wheel 10 of the second countershaft w_v2, and with an intermediate gear ZR, whereby the intermediate gear ZR enables a reversal of rotation for the reverse gear R1, R2. The intermediate gear ZR is rotatably positioned on the intermediate shaft w_zw, whereby the intermediate shaft w_zw, in this example, is parallel to the countershafts w_v1, w_v2. The intermediate gear ZR also meshes with the idler gear wheel 7 of the first countershaft w_v1.

Figure 3:
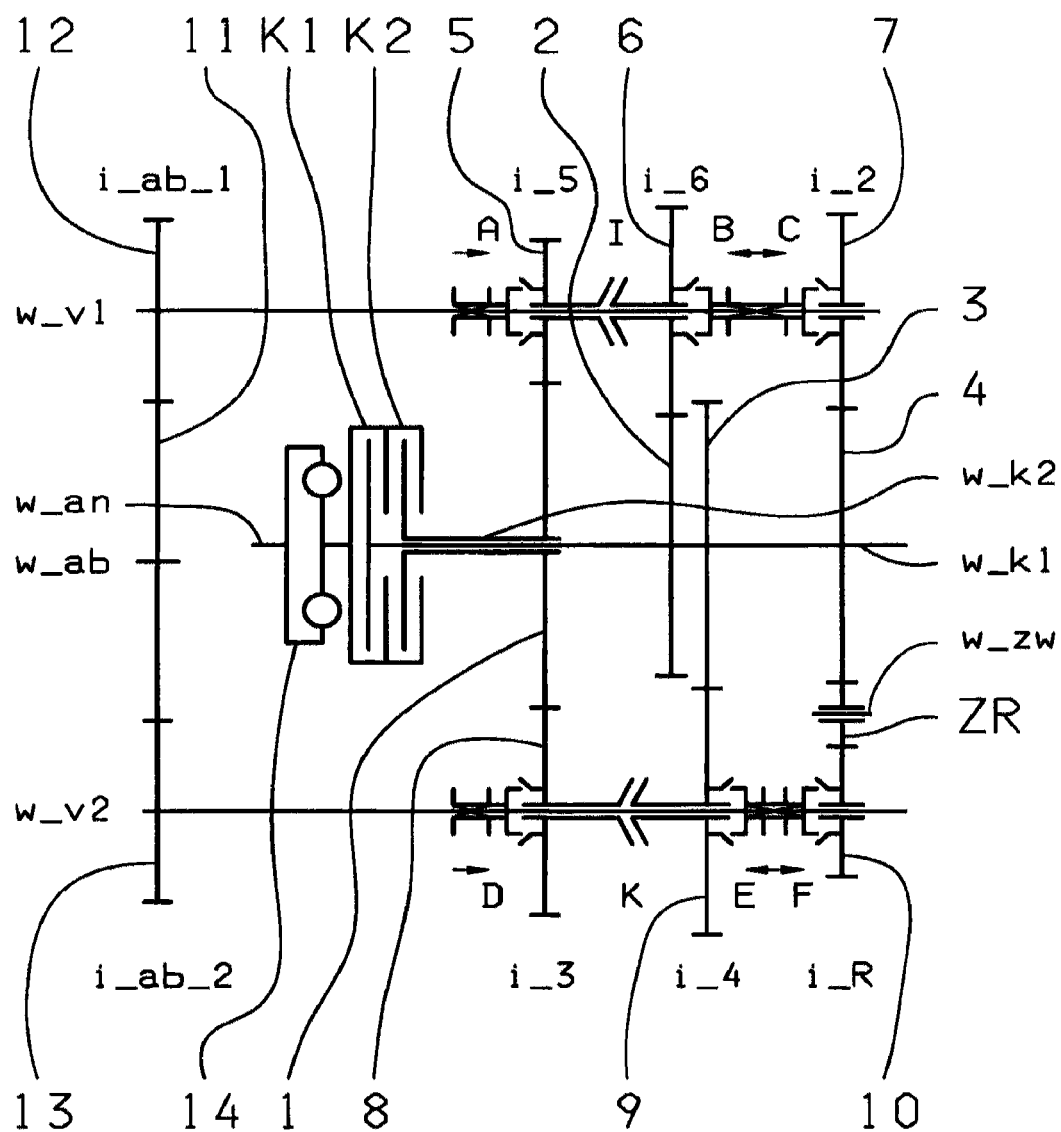
FIG. 3 a schematic view of a second embodiment of the inventive 7-gear double clutch transmission.

The second embodiment, in accordance with FIG. 3, is only different from the first embodiment by enabling the reversal of rotation for the reverse gears via the intermediate gear ZR and the idler gear wheel 10 of the second countershaft w_v2.

Figure 5:
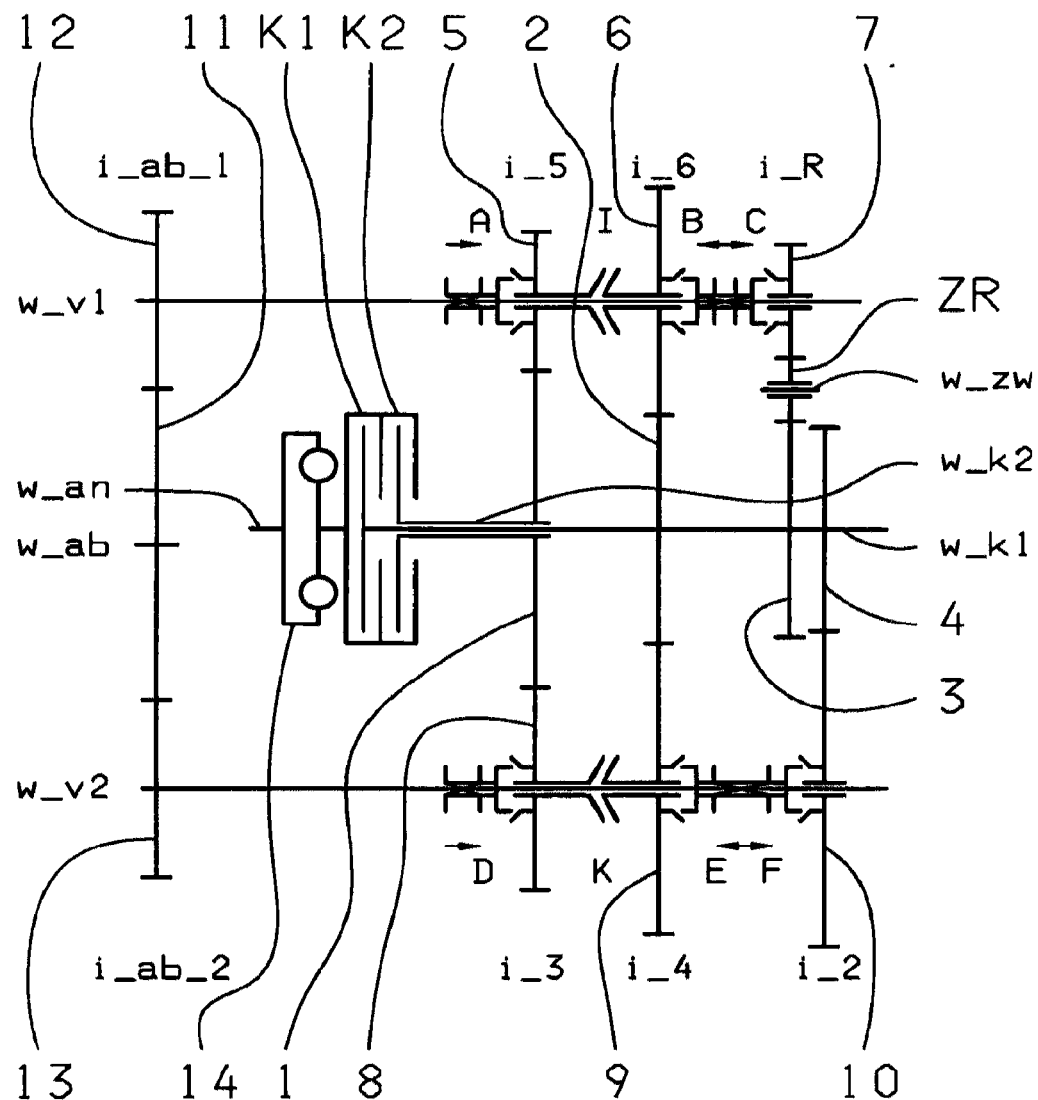
FIG. 5 a schematic view of a third embodiment of the inventive 7-gear double clutch transmission.

In the third embodiment, in accordance with FIG. 5, and in the first gear plane which is a dual gear plane 5-8, the fixed gear wheel 1 of the second transmission input shaft w_K2 meshes with the idler gear wheel 5 of the first countershaft w_v1 the idler gear wheel 8 of the second countershaft w_v2. In the second gear plane, designed as a dual gear plane 6-9, the fixed gear wheel 2 of the first transmission input shaft w_K1 meshes with the idler gear wheel 6 of the first countershaft w_v1 with the idler gear wheel 9 of the second countershaft w_v2. In the third gear plane, designed as a single gear plane 7-3, the fixed gear wheel 3 of the first transmission input shaft w_K1 meshes with an intermediate gear ZR, whereby the intermediate gear enables the reversal of rotation for a reverse gear R1, R2, R3. The intermediate gear ZR is rotatably positioned on an intermediate shaft w_zw, whereby the intermediate shaft w_zw, in this example, is positioned parallel to the countershafts w_v1, w_v2. The intermediate wheel ZR also meshes with the idler gear wheel 7 of the first countershaft w_v1. Finally, in the fourth gear plane, designed as a single gear plane 4-10, the fixed gear wheel 4 of the first transmission input shaft w_K1 meshes with the idler gear wheel 10 of the second countershaft w_v2.

Figure 7:
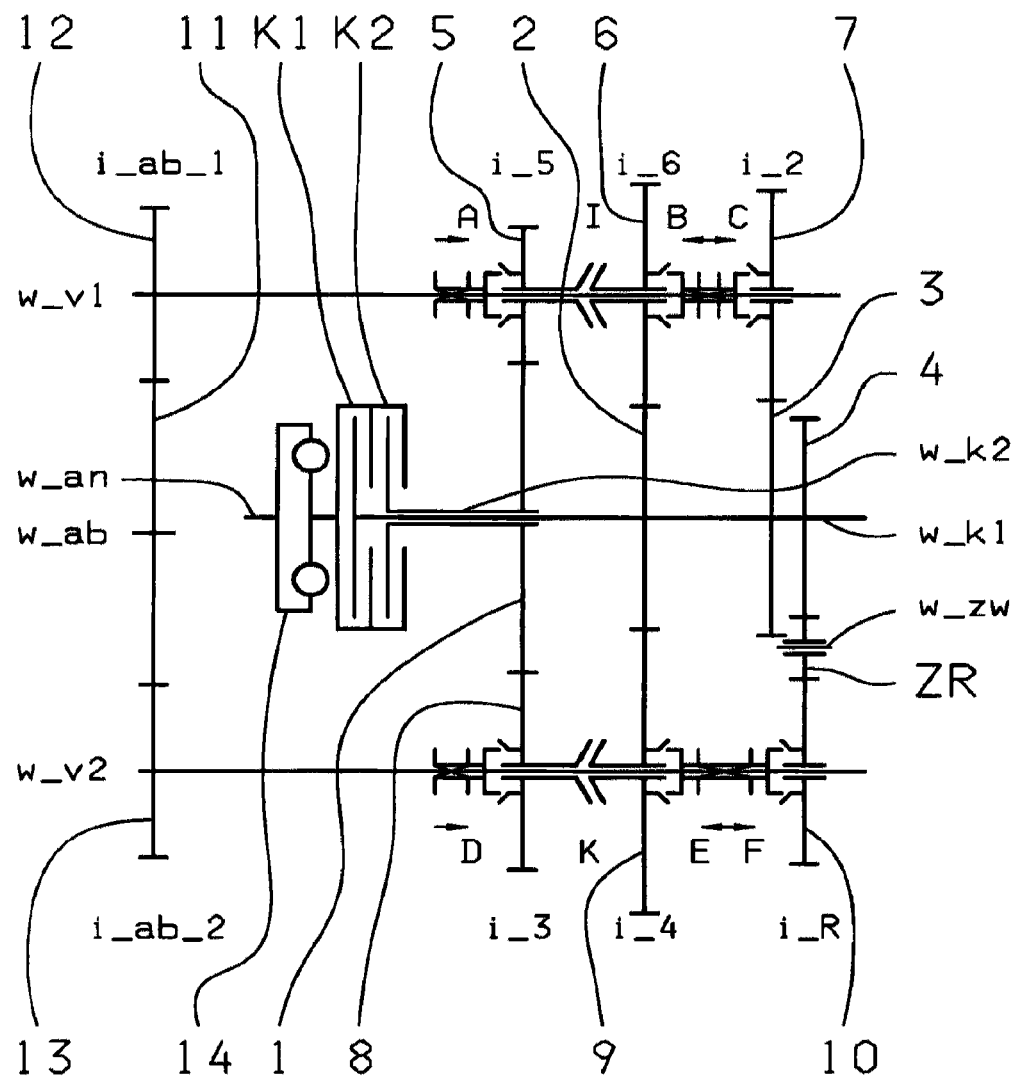
FIG. 7 a schematic view of the fourth embodiment of the inventive 7-gear double clutch transmission.

The fourth embodiment, in accordance with FIG. 7, is only different from the third embodiment in that the reversal of rotation for the reverse gears in the fourth embodiment in the third gear plane is designed as a single gear plane 7-3.

Figure 9:
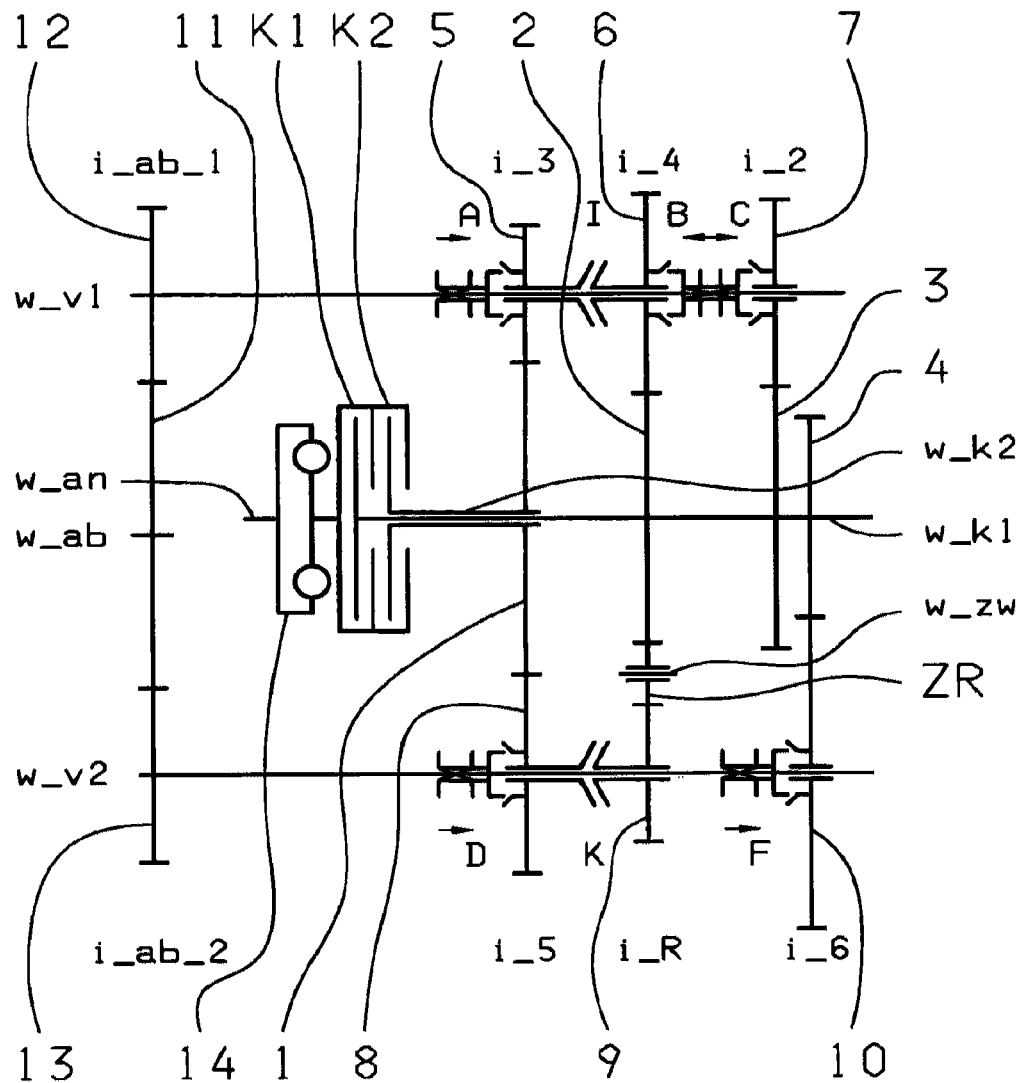
FIG. 9 a schematic view of a fifth embodiment of the inventive 7-gear double clutch transmission.
Figure 11:
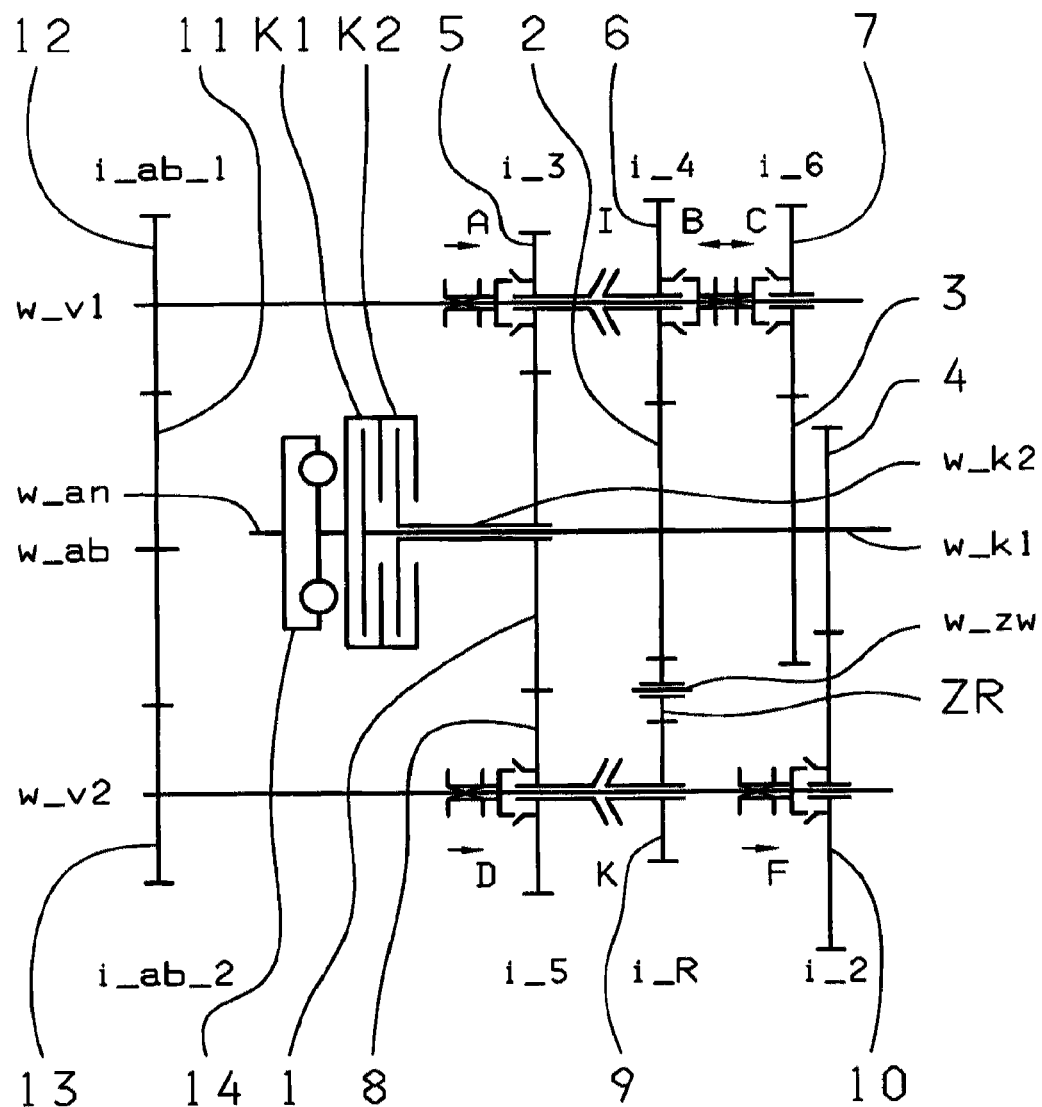
FIG. 11 a schematic view of a sixth embodiment of the inventive 7-gear double clutch transmission.

In the fifth and sixth embodiments, in accordance with FIG. 9 or FIG. 11 in the first gear plane, designed as a dual gear plane 5-8, the fixed gear wheel 1 of the second transmission input shaft w_K2 meshes with the idler gear wheel 5 of the first countershaft w_v1 and with the idler gear wheel 8 of the second countershaft w_v2. In the second gear plane, designed as a dual gear plane 6-9, the fixed gear wheel 2 of the first transmission input shaft w_K1 meshes with the idler gear wheel 6 of the a first countershaft w_v1, and with an intermediate gear ZR, whereby the intermediate gear ZR enables the reversal of rotation for a reverse gear R1. The intermediate gear ZR is rotatably positioned on an intermediate shaft w_zw, whereby the intermediate shaft w_zw, in this example, is positioned to be parallel to the countershafts w_v1, w_v2. The intermediate wheel ZR meshes also with the idler gear wheel 9 of the second countershaft w_v2. In the third gear plane, designed as a single gear plane 7-3, the fixed gear wheel 3 of the first transmission input shaft w_K1 meshes with the idler gear wheel 7 of the first countershaft w_v2. Finally, in the fourth gear plane, designed as a single gear plane 4-10, the fixed gear wheel 4 of the first transmission input shaft w_k1 meshes only the with idler gear wheel 10 of the second countershaft w_v2.

In the first and second embodiment, in accordance with FIGS. 1 and 3, dual action coupling devices B, C; E, F are positioned, in this example, on each countershaft w_v1, w_v2, whereby the dual action coupling device B, C, on the first countershaft w_v1, is positioned between the second gear plane, designed as a single gear plane 6-2, and the fourth gear plane, designed as a dual gear plane 7-10, and on the second countershaft w_v2, the dual action coupling device E, F is positioned between the third gear plane, designed as a single gear plane 3-9 and the fourth gear plane, designed as a dual gear plane 7-10. For each dual action coupling devices B, C; E, F, two single action coupling devices can also be provided. Via the coupling device B, the idler gear wheel 6 can be connected with the first countershaft w_v1, and via the coupling device C, the idler gear wheel 7 can be connected with the first countershaft w_v1. Via the coupling device E, the idler gear wheel 9 can be connected with the second countershaft w_v2 and via the coupling device F, the idler gear wheel 10 can be connected with the second countershaft w_v2.

In the third and fourth embodiment, in accordance with FIGS. 5 and 7, the dual action coupling device B, C, in contrast, is positioned on the first countershaft w_v1, between the second gear plane, designed as a dual gear plane 6-9, and the third gear plane, designed as a single gear plane 7-3, and the dual action coupling device E, F is positioned on the second countershaft w_v2, between the second gear plane, designed as a a dual gear plane 6-9, and the fourth gear plane, designed as a single gear plane 4-10.

Finally, in the fifth and sixth embodiments, in accordance with FIGS. 9 and 11, different from the third and fourth embodiments, only a single action coupling device F is provided on the second countershaft w_2, so that the second coupling device E can be omitted. The single action coupling device F is assigned to the fourth gear plane, designed as a single gear plane, so that the idler gear wheel 10, via an activated coupling device F, is connected with the second countershaft.

Independent of the respective embodiment it is provided that, for instance, a single action coupling device A is assigned to the first gear plane as a dual gear plane 5-8, to connect the idler gear wheel 5 with the first countershaft w_v1. In addition, a single action coupling device D is assigned to the first gear plane which is the dual gear plane 5-8, to connect the idler gear wheel 8 with the second countershaft w_v2.

In this inventive double clutch transmission, an integrated output stage is provided with the output gear wheel 12, which is connected in a rotationally fixed manner with the first countershaft w_v1 and with the output gear wheel 13, which is connected in a rotationally fixed manner with the second countershaft w_v2. It is also possible that the output gear wheels 12, 13 are shiftable. The output gear wheel 12 and the output gear wheel 13 each mesh with a fixed gear wheel 11 of the output shaft w_ab.

The table in FIG. 2 shows an exemplary shift scheme for the first embodiment of the 7-gear double clutch transmission, in accordance with FIG. 1.

It can be seen in the shift scheme, that the first forward gear G1 can be shifted via the second clutch K2 and via the activated coupling device F, via the activated coupling device I as a winding-path gear, the second forward gear G2 can be shifted via the first clutch K1 and via the activated coupling device F, the third forward gear G3 can be shifted via the second clutch K2 and via the activated coupling device A, the fourth forward gear G4 can be shifted via the first clutch K1 and via the activated coupling device E, the fifth forward gear G5 can be shifted via the second clutch K2 and via the activated coupling device D, the sixth forward gear G6 can be shifted via the first clutch K1 and via the activated coupling device B, and the seventh forward gear G7 can be shifted via the second clutch K2 and via the activated coupling device B, and via the activated coupling device K as a winding-path gear.

In addition, the shift scheme shows that a reverse gear R1 can be shifted via the first clutch K1 and via the activated coupling device C, as well as via the activated coupling device I as a winding-path gear, and that the overdrive O1 can be shifted via the first clutch K1 and via the activated coupling device D, as well as via the activated coupling device I as a winding-path gear.

The shift scheme, in accordance with FIG. 2, shows in particular, that for the first forward gear G1, beginning at the second clutch K2, the gear steps i_3, i_6, and i_2 are used, the two partial transmissions are coupled via the shifting device I, in the second forward gear G2, only the gear wheel step i_2, in the third forward gear G3 only the gear wheel step i_3, in the fourth forward gear G4 only the gear wheel step i_4, in the fifth forward gear G5 only the gear wheel step i_5, and in the sixth forward gear G6 only the gear wheel step i_6 is used. In the seventh gear G7, the gear wheel steps i_5, i_4, and i_6 are used, with the two partial transmissions being coupled with each of the via the shifting device K. In the reverse gear R1, only the gear wheel step i_R is used, whereby the additional, possible reverse gear R2 uses, as winding-path gear, the gear wheel steps i_3, i_6, and i_R, to couple the two partial transmissions with each other via the shifting device I. The gear wheel steps i_6, i_3, and i_5 are used for the overdrive O1, to couple the two partial transmissions with each other via the shifting device I.

FIGS. 4 and 8 each show examples of the presented table as a shift scheme for the second and the fourth embodiments of the 7-gear double clutch transmission, in accordance with FIGS. 3 and 7.

It can be seen in the shift scheme, that the first forward gear G1 can be shifted via the second clutch K2 and via the activated coupling device C, as well as the activated coupling device I as a winding-path gear, the second forward gear G2 can be shifted via the first clutch K1 and via the activated coupling device C, the third forward gear G3 can be shifted via the second clutch K2 and via the activated coupling device D, the fourth forward gear G4 can be shifted via the first clutch K1 and via the activated coupling device E, the fifth forward gear G5 can be shifted via the second clutch K2 and via the activated coupling device A, the sixth forward gear G6 can be shifted via the first clutch K1 and via the activated coupling device B, and that the seventh forward gear G7 can be shifted via the first clutch K1, the activated coupling device A, and the activated shifting device K as a winding-path gear.

In addition, the shift scheme shows that a reverse gear R1 is shifted via the first clutch K1 and via the activated coupling device F, an additional reverse gear R2 is shifted via the second clutch K2, the activated coupling device F, and the activated shifting device I as a winding-path gear, an additional reverse gear R3 is shifted via a second clutch K2, the activated coupling device F, and the activated shifting device K as a winding-path gear, and that at least one slow speed gear C1 is shifted via the first clutch K1, the activated coupling device C, and the activated shifting device K as a winding-path gear.

Additionally, for the second and the fourth embodiment, a coupling device S_ab1, is not shown in the schematic views for simplicity reasons, and is provided on the first countershaft w_v1, which is assigned to the output gear wheel 12, to disconnect it, when not engaged, first countershaft w_v1, an additional slow gear C2 is created via the first clutch K1, via the engaged, or activated coupling device A and via the activated coupling device C and the activated coupling device D as a winding-path gear, if the additional coupling device S_ab1 is not engaged. In addition, an overdrive gear O1 is shiftable via the second clutch K2, via the activated coupling device A and via the activated coupling device C, the activated coupling device E as a winding-path gear, if the additional coupling device S_ab1 is not engaged.

The shift schemes in accordance with FIGS. 4 and 8 show in particular, that for the first forward gear G1, beginning at the second clutch K2, the gear wheel steps i_5, i_6, and i_2 are used and the two partial transmissions are coupled via the shifting device I. In the second forward gear G2 only the gear step i_2 is used, in the third forward gear G3 the gear step i_3, in the fourth forward gear G4 the gear step i_4, in the fifth forward gear G5 the gear step i_5, and in the sixth forward gear G6 the gear step i_6 is used. In the seventh forward gear G7, the gear wheel steps i_4, i_3, and i_5 are used, the two partial transmissions are connected with each other via the shifting device K. In the reverse gear R1, only the gear wheel step i_R is used, the additional reverse gear R2, as a winding-path gear, uses the gear wheel steps i_5, i_6, and i_R, to couple the two partial transmissions with each other via the shifting device I. In the next reverse gear R3, the gear wheel steps i_3, i_4, and i_R are used to couple the two partial transmissions via the shifting device. For the slow gear C1, as winding-path gear, the gear wheel steps i_3, i_4, and i_2 are used to combine the two partial transmissions via the shifting device K. In the additional slow gear C2, as a winding-path gear, the gear wheel steps i_2, i_5, and i_3 are used, the possibility of coupling the two partial transmissions via the disengaged coupling device S_ab1. Finally, the gear wheel steps i_5, i_2, and i_4 are used for the overdrive gear O1, whereby the possibility of coupling the two partial transmissions is realized via the disengaged coupling device S_ab1.

Because the gear wheels steps i_4 and i_6, in the second embodiment, in accordance with FIGS. 3 and 4, are each assigned to a single gear plane 6-2, 3-9, and the gear wheel steps i_5, i_6, i_2 are assigned to the first forward gear G1, as winding-path gear, and the forward gears i_4, i_3, i_5 are assigned to the forward gear G7, as winding-path gear, the dependency of the gear ratios result in especially easy geometric steps. Due to the fact that in the fourth embodiment, in accordance with FIG. 7, the gear wheel step i_R is assigned to a single gear plane 4-10, and is positioned on the second countershaft w_v2 together with the gear wheels steps i_3, i_4 such that the reverse gears can easily be realized.

The table in FIG. 6 shows an example of a shift scheme for the third embodiment of a 7-gear double clutch transmission, in accordance with FIG. 5.

The shift scheme shows that the first forward gear G1 is shifted via the second clutch K2, the activated coupling device F and the activated shifting device I as winding-path gear, the second forward gear G2 is shifted via the first clutch K1 and the activated coupling device F, the third forward gear G3 is shifted via the second clutch K2 and the activated coupling device D, the fourth forward gear G4 is shifted via the first clutch K1 and the activated coupling device E, the fifth forward gear G5 is shifted via the second clutch K2 and the activated coupling device A, the sixth forward gear G6 is shifted via the first clutch K1, and the activated coupling device B, and the seventh forward gear G7 is shifted via the first clutch K1, the activated coupling device A, and the activated coupling device K as a winding-path gear.

In addition, the shift scheme shows that a reverse gear R3 is shifted via the first clutch K1 and the activated coupling device C, and a slow gear C1 is shifted via the second clutch K2, the activated coupling device F, the activating shifting device K as a winding-path gear.

In the third embodiment, an additional coupling device S_ab1 on the first countershaft w_v1 is assigned to the output gear wheel 12, to disconnect, in the activated condition of the coupling device S_ab1, the output gear wheel 12 from the first countershaft w_v1, a reverse gear R1 is shifted via the second clutch K2, the activated coupling device A, the activated coupling device C, and the activated coupling device E as a winding-path gear, when the additional coupling device S_ab1 is not engaged. Also, an additional reverse gear R2 is shifted via the second clutch K2, the activated coupling device C, and the activated coupling device F as a winding-path gear, if the additional coupling device S_ab1 is not engaged.

If, in the third embodiment, an additional coupling device S_ab2 on the second countershaft w_v2 is assigned to the output gear wheel 13, to disconnect the output gear wheel 13 from the second countershaft w_v2 in the activated condition of the coupling device S_ab2, an overdrive gear O1 is shifted via the second clutch K2 as a winding-path gear, if the additional coupling device S_ab2 is not engaged.

The shift scheme, in accordance with FIG. 6, shows in particular, that in the first forward gear G1, beginning at the second clutch K2, the gear wheel steps i_5, i_6, and i_2 are used, and the two partial transmissions are coupled via the shifting device I. In the second forward gear G2 only the gear wheel step i_2, in the third forward gear G3 the gear wheels step i_3, in the fourth forward gear G4 the gear wheel step i_4, in the fifth forward gear G5 the gear wheel step i_5, and in the sixth forward gear G6 the gear wheel step i_6 is used. In the seventh forward gear G7, the gear wheel steps i_4, i_3, and i_5 are used, and the two partial transmissions are coupled with each other via the shifting device K. In the reverse gear R1, the gear wheel steps i_5, i_R, and i_4 are used as winding-path gear, and coupling the two partial transmissions is realized via the disengaged coupling device S_ab1. In an additional, possible reverse gear R2, the gear wheels steps i_5, i_R, and i_2 are used as winding-path gear, and coupling the two partial transmissions is realized via the disengaged coupling device S_ab1. In a next reverse gear R3, the gear wheel step i_R is used. For the slow gear C1 as winding-path gear, the gear wheel steps i_3, i_4, and i_2 are used and to couple the two partial transmissions with each other the shifting device K is used. Finally, for the overdrive gear O1, the gear wheel steps i_3, i_2, and i_6 are used, and coupling the two partial transmissions is realized via the coupling device S_ab2.

In the third embodiment, the next to last step can be selected, so that the driver, when downshifting, has especially a large drive power available, or drive torque, respectively.

FIG. 10 shows a table which presents and example of a shift scheme for the fifth embodiment of the 7-gear double clutch transmission.

The shift scheme shows that the first forward gear G1 is shifted via a second clutch K2, the activated coupling device C, and the activated shifting device I as winding-path gear, the second forward gear G2 is shifted via the first clutch K1 and the activated coupling device C, the third forward gear G3 is shifted via the second clutch K2 and the activated coupling device A, the fourth forward gear G4 is shifted via the first clutch K1 and the activated coupling device B, the fifth forward gear G5 is shifted via the second clutch K2 and the activated coupling device D, the sixth forward gear G6 is shifted via the first clutch K1 and the activated coupling device F, and the seventh forward gear G7 is shifted via the first clutch K1, the activated coupling device D, and the activated shifting device I as a winding-path gear.

In addition, the shift scheme shows that the reverse gear R1 is shifted via the second clutch K2, the activated coupling device C, and the activated shifting element K as a winding-path gear.

In the fifth embodiment, if an additional coupling device S_ab1, on the first countershaft w_v1, is assigned to the output gear wheel 12 to disconnect the output gear wheel 12 from the first countershaft w_v1, during the activated condition of the coupling device S_ab1, an overdrive gear O1 is shifted via the second clutch K2, the activated coupling device A, the activated coupling device C, and the activated coupling device F as winding-path gear, if the additional coupling device S_ab1 is disengaged.

The shift scheme, in accordance with FIG. 10, shows in particular that in the first forward gear G1, beginning at the second clutch K2, the gear wheel steps i_3, i_4, and i_2 are used, and the two partial transmissions are coupled via the shifting device I. In the second forward gear G2, only the gear wheel step i_2 is used, in the third forward gear G3 the gear wheel step i_3, in the fourth forward gear G4 the gear wheel step i_4, in the fifth forward gear G5 the gear wheel step i_5, and in the sixth forward gear G6 the gear wheel step i_6 is used. In the seventh forward gear G7, the gear wheel steps i_4, i_3, and i_5 are used, the two partial transmissions are coupled with each other via a shifting device I. In the reverse gear R1 the gear wheel steps i_5, i_R, and i_2 are used, and the two partial transmissions are coupled via the activated shifting device K. Finally, for the overdrive gear O1, the gear wheel steps i_3, i_2, and i_6 are used, and coupling the two partial transmissions is realized via the disengaged coupling device S_ab1.

Due to the fact that, in the fifth embodiment, the gear wheel step i_2 of the second forward gear G2 is positioned on the first countershaft w_v1, together with the gear wheels steps of gears G3 and G4, and is assigned to a single gear plane 7-3, and that the first forward gear G1 is winding via the gear steps of gears G2, G3, and G4, the transmission steps can be suitably adapted.

FIG. 12 presents a table which shows an example of a shift scheme of the sixth embodiment of the 7-gear double clutch transmission, in accordance with FIG. 11.

The shift scheme shows, that the first forward gear G1 is shifted via a second clutch K2, the activated coupling device F and the activated shifting device I as winding-path gear, the second forward gear G2 is shifted via the first clutch K1 and the activated coupling device F, the third forward gear G3 is shifted via the second clutch K2 and the activated coupling device A, the fourth forward gear G4 is shifted via the first clutch K1 and the activated coupling device B, the fifth forward gear G5 is shifted via the second clutch K2 and the activated coupling device D, the sixth forward gear G6 is shifted via the first clutch K1 and the activated coupling device C, and the seventh forward gear G7 is shifted via the first clutch K1, the activated coupling device D, and the activated shifting device I as a winding-path gear.

In addition, the shift scheme shows that the reverse gear R1 is shifted via the second clutch K2, the activated coupling device F, and the activated shifting device K as a winding-path gear.

In the sixth embodiment, if an additional coupling device S_ab2, on the second countershaft w_v2, is assigned to the output gear wheel 13, to disconnect the output gear wheel 13 from the second countershaft w_v2, during the activated or non-engaged condition of the coupling device S_ab2, a low speed gear C1 is shifted via the first clutch K1, via the activated coupling device A, the activated coupling device D and the activated coupling device F as a winding-path gear, if the additional coupling device s_ab2 is disengaged. Also, an overdrive gear O1 is shifted via the second clutch K2, the activated coupling device D and the coupling device F as a winding-path gear, if the additional coupling device S_ab2 is disengaged.

In the sixth embodiment, if an additional coupling device S_ab1 on the first countershaft w_v1 is assigned to the output gear 12, to disconnect the output gear 12 from the first countershaft w_v1, when the coupling device S_ab1 is in an active condition, an additional overdrive gear O2 is shifted via the first clutch K1, the activated coupling device A, the activated coupling device C, and the activated coupling device D as winding-path gear, if the additional coupling device S_ab1 is disengaged.

The shift scheme, in accordance with FIG. 12, shows in particular that in the first forward gear O1, beginning with the second clutch K2, the gear wheel steps i_3, i_4, and i_2 are used, and the two partial transmissions are coupled via the shifting device I. In second forward gear G2, only the gear wheel step i_2 is used, in the third forward gear G3 the gear wheel step i_3, in the fourth gear G4 the gear wheel step i_4, in the fifth gear G5 the gear wheel step i_5, and in the sixth forward gear G6 the gear wheel step i_6 is used. In the seventh forward gear G7, the gear wheel steps i_4, i_3, and i_5 are used, and the two partial transmissions are coupled via the shifting device I. In the reverse gear R1, the gear wheel steps i_5, i_R, and i_2 are used as winding-path gear, and the two partial transmissions are coupled via the activated shifting device K. For the low speed gear C1, the gear wheels steps i_2, i_5, and i_3 are used as winding-path gear, coupling the two partial transmissions is realized via the disengaged coupling device S_ab2. For the overdrive gear O1, as winding-path gear, the gear wheel steps i_5, i_2, and i_4 are used, and coupling of the two partial transmissions is realized via the disengaged coupling device S_ab2. Finally, in an additional overdrive gear O2, the gear wheel steps i_6, i_3, and i_5 are used as a winding-path gear, and coupling of the two partial transmissions is realized via an non-engaged coupling device S_ab1.

For example, through the use of the additional coupling devices S_ab1 and S_ab2 in the sixth embodiment, two overdrive gears can be realized as winding-path gears.

Summarizing the first embodiment, in accordance with FIGS. 1 and 2, it is shown that in the first gear plane 3-9, designed as dual gear plane 5-8, the idler gear wheel 5 can be used for the three forward gears G1, G3, O1, as well as for a reverse gear R2, and the idler gear wheel 8 can be used for the three forward gears G5, G7, O1. In the second gear plane, designed as single gear plane 6-2, the idler gear wheel 6 can be used for the four forward gears G1, G6, G7, O1, and for a reverse gear R2. In addition, in the third gear plane, designed as single gear plane, the idler gear wheel 9 can be used for two forward gears G4, G7. Finally, in the fourth gear plane, designed as dual gear plane 7-10, the idler gear wheel 7 can be used for two reverse gears R1, R2, and the idler gear wheel 10 can be used for two forward gears G1, G2.

Summarizing, it is shown in the second embodiment, in accordance with FIGS. 3 and 4, that in the a first gear plane, designed as dual gear plane 5-8, the idler gear wheel 5 can be used for five forward gears G1, G5, G7, C2, O1, as well as for a reverse gear R2, and the idler gear wheel 8 can be used for four forward gears G3, G7, C1, C2, as well as for one reverse gear R3. In the second gear plane, designed as single gear plane 6-2, the idler gear wheel 6 can be used for two forward gears G1, G6, and for one reverse gear R2. In addition, in the third gear plane, designed as single gear plane 3-9, the idler gear wheel 9 can be used for four forward gears G4, G7, C1, O1, as well as for one reverse gear R3. Finally, in the fourth gear plane, designed as dual gear plane 7-10, the idler gear wheel 7 can be used for five forward gears G1, G2, C1, C2, O1, and the idler gear wheel 10 can be used for the reverse gears R1, R2, R3.

Summarizing the third embodiment, in accordance with FIGS. 5 and 6, it is shown that in the first gear plane, designed as dual gear plane 5-8, the idler gear wheel 5 can be used for three forward gears G1, G5, G7, and for two reverse gears R1, R2, and the idler gear wheel 8 can be used for four forward gears G3, G7, C1, O1. In the second gear plane, designed as dual gear plane 6-9, the idler gear wheel 6 can be used for three forward gears G1, G6, O1, and the idler gear wheel 9 can be used for three forward gears G4, G7, C1, and for one reverse gear R1. In the third gear plane, designed as single gear plane 7-3, the idler gear wheel 7 can be used for three reverse gears R1, R2, R3. Finally, in the fourth gear plane, designed as single gear plane 4-10, the idler gear wheel 10 can be used for four forward gears G1, G2, C1, O1, and for one reverse gear R2.

Summarizing the fourth embodiment, in accordance with FIGS. 7 and 8, it is shown that in the first gear plane, designed as dual gear plane 5-8, the idler gear wheel 5 can be used for five forward gears G1, G5, G7, C2, O1, and for one reverse gear R2, and that the idler gear wheel 8 can be used for four forward gears G3, G7, C1, C2, as well as for one reverse gear R3. In the second gear plane, designed as dual gear plane 6-9, the idler gear wheel 6 can be used for two forward gears G1, G6, and the idler gear wheel 9 can be used for four forward gears G4, G7, C1, O1, and for one reverse gear R3. In the third gear plane, designed as single gear plane 7-3, the idler gear wheel 7 can be used for five forward gears G1, G2, C1, C2, O1. Finally, in the fourth gear plane, designed as single gear plane 4-10, the idler gear wheel 10 can be used for three reverse gears R1, R2, R3.

Summarizing the fifth embodiment, in accordance with FIGS. 9 and 10, it is shown that in the a first gear plane, designed as dual gear plane 5-8, the idler gear wheel 5 can be used for four forward gears G1, G3, G7, O1, and the idler gear wheel 8 can be used for two forward gears G5, G7 and for one reverse gear R1. In the second gear plane, designed as dual gear plane 6-9, the idler gear wheel 6 can be used for three forward gears G1, G4, G7, and the idler gear wheel 9 can be used for one reverse gear R1. In addition, in the third gear plane, designed as single gear plane 7-3, the idler gear wheel 7 can be used for three forward gears G1, G2, O1, and for one reverse gear R1. Finally, in the a fourth gear plane, designed as a single gear plane 4-10, the idler gear wheel 10 can be used for two forward gears G6, O1.

Summarizing the sixth embodiment, in accordance with FIGS. 11 and 12, it is shown that in the first gear plane, designed as dual gear plane 5-8, the idler gear wheel 5 can be used for five forward gears G1, G3, G7, C1, O1, and the idler gear wheel 8 can be used for five forward gears G5, G7, C1, O1, O2, and for one reverse gear R1. In the second gear plane, designed as dual gear plane 6-9, the idler gear wheel 6 can be used for four forward gears G1, G4, G7, O1, and the idler gear wheel 9 can be used for one reverse gear R1. In the third gear plane, designed as single gear plane 7-3, the idler gear wheel 7 can be used for two forward gears G6, O2. Finally, in the fourth gear plane, designed as single gear plane 4-10, the idler gear wheel 10 can be used for four forward gears G1, G2, C1, O1, and for one reverse gear R1.

In all embodiments of the double clutch transmission due to the provided multiple uses of certain idler gear wheels, less gear planes are required and therefore less component parts, while still having the same amount of gears, which results in an advantageous construction saving space and in a cost reduction.

Independent from the respective embodiment, the numeral "1" in a box of the respective table of the shift schemes means that the associated clutch K1, K2, or the associated coupling devices A, B, C, D, E, F or the associated shifting devices K, I are engaged. In contrast, an empty box in the respective table of the shift schemes means that the associated clutch K1, K2, or the associated coupling device A, B, C, D, E, F or the associated shifting device K, I is disengaged.

Deviating from the previously mentioned rules, with regard to the coupling device S_ab1, or S_ab2 assigned to a respective drive gear wheel 12, or 13 that the coupling device S_ab1, or S_ab2 in case of an empty box in the associated table of the shift schemes, must be disengaged but that, a box having the numeral "1", depending from the gear in a first group of gears, the coupling device S_ab1, or S_ab2 must be engaged, and in a second group of gears, the coupling device S_ab1, or S_ab2 can be both non-engaged or also engaged. In addition, there is the possibility in many cases to add additional coupling devices or shifting devices, without affecting the flow of force. A gear pre-selection is hereby enabled.

| Reference Characters | |
|---|---|
| 1 | Fixed gear wheel of the second transmission input shaft |
| 2 | Fixed gear wheel of the first transmission input shaft |
| 3 | Fixed gear wheel of the first transmission input shaft |
| 5 | Idler gear wheel of the first countershaft |
| 6 | Idler gear wheel of the first countershaft |
| 7 | Idler gear wheel of the first countershaft |
| 8 | Idler gear wheel of the second countershaft |
| 9 | Idler gear wheel of the second countershaft |
| 10 | Idler gear wheel of the second countershaft |
| K1 | First clutch |
| K | Second clutch |
| w_an | Drive Shaft |
| w_ab | Drive Shaft |
| w_v1 | First Countershaft |
| w_v2 | Second Countershaft |
| A | Coupling Device |
| B | Coupling Device |
| C | Coupling Device |
| D | Coupling Device |
| E | Coupling Device |
| F | Coupling Device |
| i_1 | Gear Wheel Step, first forward gear |
| i_2 | Gear Wheel Step, second forward gear |
| i_3 | Gear Wheel Step, third forward gear |
| i_4 | Gear Wheel Step, fourth forward gear |
| i_5 | Gear Wheel Step, fifth forward gear |
| i_6 | Gear Wheel Step, sixth forward gear |
| G1 | First forward gear |
| G2 | Second forward gear |
| G3 | Third forward gear |
| G4 | Fourth forward gear |
| G5 | Fifth forward gear |
| G6 | Sixth forward gear |
| C1 | Low Speed Gear |
| O1 | Overdrive Gear |
| R1 | Reverse Gear |
| R2 | Reverse Gear |
| R3 | Reverse Gear |
| w_zw | Intermediate Shaft |
| ZR | Intermediate Gear |
| 11 | Fixed Gear Wheel of the Drive Shaft |
| 12 | Drive Gear Wheel of the first Countershaft |
| 13 | Drive Gear Wheel of the second Countershaft |
| 14 | Torsion Vibration Damper |
| ZS | Gear Wheel Step in use |
| K | Shifting device |
| I | Shifting device |
| S_ab1 | Coupling Device, optional |
| S_ab2 | Coupling Device, optional |

The invention claimed is:

1. A double clutch transmission comprising:
first and second clutches (K1, K2) each comprising an input side connected to a drive shaft (w_an) and an output side connected to one of a first and a second transmission input shaft (w_K1, w_K2) that are arranged coaxially with one another;
at least first and second countershafts (w_v1, w_v2) rotatably supporting a plurality of idler gear wheels (5, 6, 7, 8, 9, 10);
a plurality of fixed gear wheels (1, 2, 3, 4) being connected, in a rotationally fixed manner, to each of the first and second transmission input shafts (w_K1, w_K2) and each of the plurality of fixed gear wheels (1, 2, 3, 4) engaging at least one of the idler gear wheels (5, 6, 7, 8, 9, 10);
a plurality of coupling devices (A, B, C, D, E, F) for each coupling one of the idler gear wheels (5, 6, 7, 8, 9, 10), in a rotationally fixed manner, to one of the first and the second countershafts (w_v1, w_v2);
a drive output gear (12, 13) being supported on a respective one of the first and the second countershafts (w_v1, w_v2) and engaging gearing of an output shaft (w_ab);
at least one shifting device (I, K) for coupling two of the gear wheels such that a plurality of power shift forward drive gears (1, 2, 3, 4, 5, 6) and at least one reverse drive gear (R1, R2, R3) are engagable;
first and second dual gear planes (5-8, 6-9, 5-8, 7-10) comprising one idler gear wheel (5, 6, 7, 8, 9, 10) of each of the first and the second countershafts (w_v1, w_v2) and a fixed gearwheel (1, 2, 3, 4) of one of the first and the second transmission input shafts (w_K1, w_K2) such that in each of the first and the second dual gear planes (5-8, 6-9, 5-8, 7-10) at least one of the idler gear wheels (5, 6, 7, 8, 9, 10) of the first and the second countershafts (w_v1, w_v2) is utilized for engaging at least two drive gears; and
first and second single gear planes (6-2, 3-9; 7-3, 4-10) comprising one idler gear wheel (5, 8; 6, 9; 7, 10) of one of the first and the second countershafts (w_v1, w_v2) and a fixed gear wheel (1, 2, 3, 4) of one of the first and the second transmission input shafts (w_K1, w_K2) such that at least one winding-path gear is engagable via the at least one shifting device (I, K).

2. The double clutch transmission according to claim 1, wherein
a first shifting device (I) is arranged on the first countershaft (w_v1) and couples an idler gear wheel (5) of a second partial transmission and an idler gear wheel (6) of a first partial transmission such that at least a first forward gear (G1) is engaged as a first of the at least one winding-path gear by engagement of the first shifting device (I) on the first countershaft (w_v1); and
a second shifting device (K) is arranged on the second countershaft (w_v2) and couples another idler gear wheel (8) of the second partial transmission and another idler gear wheel (9) of the first partial transmission such that at least a seventh forward gear (G7) is engaged as a second of the at least one winding-path gear by engagement of the second shifting device (K) on the second countershaft (w_v2).

3. The double clutch transmission according to claim 2, wherein a reverse gear (R1) is engaged as a third of the at least one winding-path gear by engagement of at least one of the first shifting device (I) on the first countershaft (w_v1) and the second shifting device (K) on the second countershaft (w_v2).

4. The double clutch transmission according to claim 1, wherein
a first shifting device (I) on the first countershaft (w_v1) couples an idler gear wheel (5) of a second partial transmission and an idler gear wheel (6) of a first partial transmission such that at least a first forward gear (G1) and a seventh forward gear is engaged as a first of the at least one winding-path gear by engagement of the first shifting device (I) on the first countershaft (w_v1); and
a second shifting device (K) on the second countershaft (w_v2) couples another idler gear wheel (8) of the second partial transmission and another idler gear wheel (9) of the first partial transmission such that a reverse gear (R1) is engaged as a second of the at least one winding-path gear by engagement of the second shifting device (K) on the second countershaft (w_v2).

5. The double clutch transmission according to claim 1, wherein the first dual gear plane (5-8) comprises a fixed gear wheel (1) on the second transmission input shaft (w_K2) of a second partial transmission, and the first and the second single gear planes (6-2, 3-9) and the second dual gear plane (7-10) comprise three fixed gear wheels (2, 3, 4) on the first transmission input shaft (w_K1) of a first partial transmission.

6. The double clutch transmission according to claim 1, wherein the first dual gear plane (5-8) comprises a fixed gear wheel (1) on the second transmission input shaft (w_K2) of a second partial transmission, and the second dual gear plane (6-9) and the first and the second single gear planes (7-3, 4-10) comprise three fixed gear wheels (2, 3, 4) on the first transmission input shaft (w_K1) of a first partial transmission.

7. The double clutch transmission according to claim 1, wherein the at least one shifting device (I, K) comprises first and second shifting devices (I, K);
    a first forward gear (G1) is engaged as a first of the at least one winding-path gear by engagement of the second clutch (K2), a fifth coupling device (F), and the first shifting device (I);
    a second forward gear (G2) is engaged by engagement of the first clutch (K1) and the fifth coupling device (F);
    a third forward gear (G3) is engaged by engagement of the second clutch (K2) and a first coupling device (A);
    a fourth forward gear (G4) is engaged by engagement of the first clutch (K1) and a fourth coupling device (E);
    a fifth forward gear (G5) is engaged by engagement of the second clutch (K2) and a third coupling device (D);
    a sixth forward gear (G6) is engaged by engagement of the first clutch (K1) and a second coupling device (B); and
    a seventh forward gear (G7) is engaged as a second of the at least one winding-path gear by engagement of the second clutch (K2), the second coupling device (B) and the second shifting device (K).

8. The double clutch transmission according to claim 7, wherein a reverse gear (R1) is engaged by engagement of the first clutch (K1) and a sixth coupling device (C);
    a second reverse gear (R2) is engaged as a third of the at least one winding-path gear by engagement of the second clutch (K2), the sixth coupling device (C) and the first shifting device (I); and
    an overdrive gear (O1) is engaged a fourth of the at least one winding-path gear by engagement of the first clutch (K1), third coupling device (D) and the first shifting device (I).

9. The double clutch transmission according to claim 1, wherein the at least one shifting device (I, K) comprises first and second shifting devices (I, K);
    a first forward gear (G1) is engaged as a first of the at least one winding-path gear by engagement of the second clutch (K2) and a third coupling device (C) and the first shifting device (I);
    a second forward gear (G2) is engaged by engagement of the first clutch (K1) and the third coupling device (C);
    a third forward gear (G3) is engaged by engagement of the second clutch (K2) and a fourth coupling device (D);
    a fourth forward gear (G4) is engaged by engagement of the first clutch (K1) and a fifth coupling device (E);
    a fifth forward gear (G5) is engaged by engagement of the second clutch (K2) and a first coupling device (A);
    a sixth forward gear (G6) is engaged by engagement of the first clutch (K1) and a second coupling device (B); and
    a seventh forward gear (G7) is engaged as a second of the at least one winding-path gear by engagement of the first clutch (K1), the first coupling device (A) and the second shifting device (K).

10. The double clutch transmission according to claim 7, wherein
    a reverse gear (R1) is engaged by engagement of the first clutch (K1) and the coupling device (F);
    another reverse gear (R2) is engaged as a third of the at least one winding-path gear by engagement of the second clutch (K2), the fifth coupling device (F) and the shifting device (I);
    a further reverse gear (R3 and) is engaged as a fourth of the at least one winding-path gear by engagement of the second clutch (K2), the fifth coupling device (F) and the second shifting device (K);
    at least one low speed gear (C1) is engaged as a fifth of the at least one winding-path gear by engagement of the first clutch (K1), a sixth coupling device (C) and the second shifting device (K).

11. The double clutch transmission according to claim 1, wherein the at least one shifting device (I, K) comprises first and second shifting devices (I, K);
    a first forward gear (G1) is engaged as a first of the at least one winding-path gear by engagement of the second clutch (K2), a fifth coupling device (F) and the first shifting element (I);
    a second forward gear (G2) is engaged by engagement of the first clutch (K1) and the fifth coupling device (F);
    a third forward gear (G3) is engaged by engagement of the second clutch (K2) and a third coupling device (D);
    a fourth forward gear (G4) is engaged by engagement of the first clutch (K1) and a fourth coupling device (E);
    a fifth forward gear (G5) is engaged by engagement of the second clutch (K2) and a first coupling device (A);
    a sixth forward gear (G6) is engaged by engagement of the first clutch (K1) and a second coupling device (B); and
    a seventh forward gear (G7) is engaged as a second of the at least one winding-path gear by engagement of the first clutch (K1), the first coupling device (A) and a second shifting device (K).

12. The double clutch transmission according to claim 11, wherein a reverse gear (R3) is engaged by engagement of the first clutch (K1) and a sixth coupling device (C); and
    a low speed gear (C1) is engaged as a third of the at least one winding-path gear by engagement of the second clutch (K2), the fifth coupling device (F) and the second shifting device (K).

13. The double clutch transmission according to claim 1, wherein
    a first forward gear (G1) is engaged as a first of the at least one winding-path gear by engagement of the second clutch (K2), a third coupling device (C) and the at least one shifting device (I);
    a second forward gear (G2) is engaged by engagement of the first clutch (K1) and the third coupling device (C);
    a third forward gear (G3) is engaged by engagement of the second clutch (K2) and a first coupling device (A);
    a fourth forward gear (G4) is engaged by engagement of the first clutch (K1) and a second coupling device (B);
    a fifth forward gear (G5) is engaged by engagement of the second clutch (K2) and a fourth coupling device (D);
    a sixth forward gear (G6) is engaged by engagement of the first clutch (K1) and a fifth coupling device (F); and
    a seventh forward gear (G7) is engaged as a second of the at least one winding-path gear by engagement of the first clutch (K1), the fourth coupling device (D) and the at least one shifting device (I).

14. The double clutch transmission according to claim 13, wherein a reverse gear (R1) is engaged as a third of the at least one winding-path gear by engagement of the second clutch (K2), the third coupling device (C) and another shifting device (K).

15. The double clutch transmission according to claim 1, wherein
- a first forward gear (G1) is engaged as a first of the at least one winding-path gear by engagement of the second clutch (K2), a fifth coupling device (F) and the shifting device (I);
- a second forward gear (G2) is engaged by engagement of the first clutch (K1) and the fifth coupling device (F);
- a third forward gear (G3) is engaged by engagement of the second clutch (K2) and a first coupling device (A);
- a fourth forward gear (G4) is engaged by engagement of the first clutch (K1) and a second coupling device (B);
- a fifth forward gear (G5) is engaged by engagement of the second clutch (K2) and a fourth coupling device (D);
- a sixth forward gear (G6) is engaged by engagement of the first clutch (K1) and a third coupling device (C); and
- a seventh forward gear (G7) is engaged as a second of the at least one winding-path gear by engagement of the first clutch (K1), the fourth coupling device (D) and the at least one shifting device (I).

16. The double clutch transmission according to claim 15 wherein a reverse gear (R1) is engaged as a third of the at least one winding-path gear by engagement of the second clutch (K2), the fifth coupling device (F) and a second shifting device (K).

* * * * *